United States Patent
James et al.

(10) Patent No.: US 10,706,977 B2
(45) Date of Patent: Jul. 7, 2020

(54) IN-CONTAINMENT EX-CORE DETECTOR SYSTEM

(71) Applicant: Westinghouse Electric Company LLC, Cranberry Township, PA (US)

(72) Inventors: Michael A. James, Harmony, PA (US); Jorge V. Carvajal, Irwin, PA (US); Michael D. Heibel, Harrison City, PA (US); Nicola G. Arlia, Pittsburgh, PA (US); Robert W. Flammang, Pittsburgh, PA (US); David M. Sumego, Cranberry Township, PA (US); Melissa M. Walter, Butler, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 865 days.

(21) Appl. No.: 14/996,667

(22) Filed: Jan. 15, 2016

(65) Prior Publication Data
US 2017/0206989 A1   Jul. 20, 2017

(51) Int. Cl.
*G21C 17/00* (2006.01)
*G21C 17/108* (2006.01)
*G21C 17/116* (2006.01)
*G21C 13/02* (2006.01)

(52) U.S. Cl.
CPC .......... *G21C 17/108* (2013.01); *G21C 17/116* (2013.01); *G21C 13/02* (2013.01)

(58) Field of Classification Search
CPC ...... G21C 17/00; G21C 17/10; G21C 17/104; G21C 17/108; G21C 17/116
See application file for complete search history.

(56) References Cited

U.S. PATENT DOCUMENTS

| | | | |
|---|---|---|---|
| 3,982,131 A * | 9/1976 | Haller | G01T 3/006 250/390.01 |
| 5,108,694 A | 4/1992 | Stucker | |
| 6,061,412 A | 5/2000 | Stucker et al. | |
| 6,181,759 B1 | 1/2001 | Heibel | |
| 6,801,593 B2 | 10/2004 | Chao et al. | |
| 7,005,783 B2 | 2/2006 | Hwu et al. | |
| 7,894,565 B2 | 2/2011 | Heibel et al. | |
| 2010/0307798 A1* | 12/2010 | Izadian | H01L 24/24 174/255 |

(Continued)

FOREIGN PATENT DOCUMENTS

| | | |
|---|---|---|
| JP | H07306292 A | 11/1995 |
| JP | 2008309548 A | 12/2008 |

(Continued)

OTHER PUBLICATIONS

Internatonal Search Report and Written Opinion, PCT/US2017/012415, dated Oct. 18, 2017, 10 pages.

(Continued)

*Primary Examiner* — Marshall P O'Connor
(74) *Attorney, Agent, or Firm* — K&L Gates LLP

(57) ABSTRACT

Apparatus for amplifying low level signals within a nuclear plant's containment building, derived from the ex-core nuclear instrumentation system. The system employs vacuum micro-electronic devices in place of conventional pre-amplifier assemblies to position the pre-amplifier assemblies closer to and within the vicinity of the ex-core detector outputs.

13 Claims, 4 Drawing Sheets

(56) References Cited

U.S. PATENT DOCUMENTS

2012/0177166 A1* 7/2012 Seidel .................... G21C 17/10
376/254
2012/0201339 A1* 8/2012 Nakamura ................ G01T 1/17
376/254

FOREIGN PATENT DOCUMENTS

KR    2013 0010290 A    1/2013
WO    2011/136933 A     3/2011

OTHER PUBLICATIONS

Euorpean Patent Office "extended European search report" from corresponding EP application No. EP 17 77 0734, dated Jun. 11, 2019, 8 pp.

* cited by examiner

IN-CONTAINMENT EX-CORE DETECTOR SYSTEM

BACKGROUND

1. Field

This invention pertains generally to nuclear reactor systems employing ex-core detectors and more specifically to such nuclear reactor systems employing in-containment, ex-core detector low noise amplifier systems.

2. Related Art

In a pressurized water reactor power generating system, heat is generated within the core of a pressure vessel by a fission chain reaction occurring in a plurality of fuel rods supported within the core. The fuel rods are maintained in spaced relationship within fuel assemblies with the space between the rods forming coolant channels through which borated water flows. The hydrogen within the coolant water moderates the neutrons emitted from enriched uranium within the fuel to increase the number of nuclear reactions and thus increase the efficiency of the process. Control rod guide thimbles are interspersed within the fuel assemblies in place of fuel rod locations and serve to guide control rods, which are operable to be inserted into or withdrawn from the core. When inserted, the control rods absorb neutrons and thus reduce the number of nuclear reactions and the amount of heat generated within the core. Coolant flows through the assemblies out of the reactor to the tube side of steam generators where heat is transferred to water in the shell side of the steam generator at a lower pressure, which results in the generation of steam used to drive a turbine. The coolant exiting the tube side of the steam generator is driven by a main coolant pump back to the reactor in a closed loop cycle to renew the process.

The power level of a nuclear reactor is generally divided into three ranges: the source or start-up range, the intermediate range, and the power range. The power level of the reactor is continuously monitored to assure safe operation. Such monitoring is typically conducted by means of neutron detectors placed outside and inside the reactor core for measuring the neutron flux of the reactor. Since the neutron flux in the reactor at any point is proportional to the fission rate, the neutron flux is also proportional to the power level.

Fission and ionization chambers have been used to measure flux in the source, intermediate and power range of a reactor. Typical fission and ionization chambers are capable of operating at all normal power levels. However, they are generally not sensitive enough to accurately detect low level neutron flux emitted in the source range. Thus, separate low level source range detectors are typically used to monitor neutron flux when the power level of the reactor is in a source range.

The fission reactions within the core occur when free neutrons at the proper energy levels strike the atoms of the fissionable material contained within the fuel rods. The reactions result in the release of a large amount of heat energy which is extracted from the core in the reactor coolant and in the release of additional free neutrons which are available to produce more fission reactions. Some of these released neutrons escape the core or are absorbed by neutron absorbers, e.g., control rods, and therefore do not cause additional fission reactions. By controlling the amount of neutron absorber material present in the core, the rate of fission can be controlled. There are always random fission reactions occurring in the fissionable material, but when the core is shut down the released neutrons are absorbed at such a high rate that a sustained series of reactions do not occur. By reducing the neutron absorbent material until the number of neutrons in a given generation equals the number of neutrons in the previous generation, the process becomes a self-sustaining chain reaction and the reactor is said to be "critical." When the reactor is critical, the neutron flux is six or so orders of magnitude higher than when the reactor is shut down.

FIG. 1 illustrates the primary side of a nuclear electric power generating plant 10 in which a nuclear steam supply system 12 supplies steam for driving a turbine generator (not shown) to produce electric power. The nuclear steam supply system 12 has a pressurized water reactor 14 which includes a reactor core 16 housed within a pressure vessel 18. Fission reactions within the reactor core 16 generate heat, which is absorbed by a reactor coolant, like water, which is passed through the core. The heated coolant is circulated through hot leg piping 20 to a steam generator 22. Reactor coolant is returned to the reactor 14 from the steam generator 22 by a reactor coolant pump 24 through the cold leg coolant piping 26. Typically, a pressurized water reactor has at least two and often three or four steam generators 22 each supplied with heated coolant through a separate hot leg 20, forming with the cold leg 26 and the reactor coolant pump 24, a primary loop. Each primary loop supplies steam to the turbine generator. Two such loops are shown in FIG. 1.

Coolant returned to the reactor 14 flows downward through an annular downcomer and then upward through the core 16. The reactivity of the core, and therefore the power output of the reactor 14 is controlled on a short-term basis by control rods, which may be selectively inserted into the core. Long-term reactivity is regulated through control of the concentration of a neutron moderator such as boron dissolved in the coolant. Regulation of the boron concentration effects reactivity uniformly throughout the core as the coolant circulates through the entire core. On the other hand, the control rods effect local reactivity and therefore, result in an asymmetry of the axial and radial power distribution within the core 16.

Conditions within the core 16 are monitored by several different sensor systems. These include an ex-core detector system 28, which measures neutron flux escaping from the reactor vessel 18. The ex-core nuclear instrumentation system 28 continuously monitors the state of the reactor and provides system status to the control room. As previously mentioned, there are three types of ex-core detectors; the source, intermediate and power range detectors.

The intermediate range pre-amplifier assembly is a critical assembly that interfaces between the intermediate range detector and the Nuclear Instrumentation System Signal Processing Assembly (NISPA). The purpose of this system is to measure neutron radiation leaking out of the core to determine power level for reactor overpower protection and post-accident monitoring. The intermediate range detector measures power levels from near shutdown conditions to 200 percent power. The detectors have an integrated mineral insulated cable which connects the detector to a junction box where the mineral insulated cable is transitioned to a quadax-copper cable. FIG. 2 shows a high level circuit diagram of the ex-core intermediate range nuclear instrumentation system. The intermediate range detector 30 is positioned just outside the reactor vessel 18 in line with the reactor core 16. The output of the detector 30 is fed to a junction box 32 through the mineral insulated cable 40. The mineral insulated cable 40 is transitioned to the quadax-copper cable 42 through the junction box 32. The quadax-copper cable is connected through the penetration in the reactor containment 34 to the nuclear instrumentation system intermediate range pre-amplifier auxiliary panel 36 that contains the intermediate range pre-amplifier 44. The intermediate range pre-amplifier 44 is located outside the containment and amplifies the detector output which is then fed to a nuclear instrument signal interface 38 and a fiber optic modem 48 inside the nuclear instrumentation signal processing center 46.

Ex-core detectors for intermediate and power range are required to withstand a loss of coolant accident (LOCA) condition in which the connectors and cables are exposed to elevated temperatures of 200 degrees centigrade and gamma radiation up to 36 MRads. Current detector cable, field cable and connector designs have been shown to be very susceptible to these environmental conditions. One potential solution is to relocate at least two junction boxes outside of the flood zone. This relocation presents several issues such as increased cable losses, the need for additional junction boxes and additional equipment qualification programs and significant additional costs. Accordingly, a solution is needed that can withstand the harsh environment while maintaining or exceeding the functionality of the current system. It is an object of this invention to provide such a solution.

SUMMARY

These and other objectives are achieved in a nuclear reactor system including a nuclear reactor vessel housing a nuclear core in which fission reactions take place, by a nuclear instrumentation system for monitoring the fission reactions within the nuclear reactor vessel, with at least a portion of the nuclear instrumentation system situated within a radiation shielded containment. The nuclear instrumentation system comprises a nuclear detector responsive to the number of fission reactions within the nuclear core to provide an electrical output indicative thereof. A detector cable connects at one end to the electrical output signal of the nuclear detector, with the detector cable extending between the electrical signal output of the nuclear detector and a termination location within the containment. A vacuum micro-electronic device low noise amplifier is situated at the termination location within the containment and has a vacuum micro-electronic device input connected to the detector cable, for receiving the electrical output of the nuclear detector. The vacuum micro-electronic device is operable to amplify the electrical output of the nuclear detector to provide a nuclear detector amplified output signal. A field cable is connected at an input location of the field cable to an output of the vacuum micro-electronic device low noise amplifier, with the field cable extending from the input location through a penetration in the containment to a field cable output at a processing location outside the containment. A Nuclear Instrumentation System Signal Processing Assembly is located outside the containment at the processing location and is connected at the field cable output and is operable to receive the nuclear detector amplified output signal and from the nuclear detector amplified output signal determine the level of neutron radiation emitted within the core to determine a power level of the nuclear reactor system.

In one embodiment, the nuclear detector is an intermediate range nuclear detector and desirably the detector cable is an integrated mineral insulated cable. Desirably, the vacuum micro-electronic device replaces an intermediate range pre-amplifier in a conventional ex-core nuclear instrumentation system. Preferably, the vacuum micro-electronic device also replaces a junction box between the intermediate range pre-amplifier and the nuclear detector in a conventional ex-core nuclear instrumentation system. Desirably, the vacuum micro-electronic device is located within the containment in relatively close proximity to the nuclear detector. In one embodiment, the nuclear reactor vessel is supported within a reactor cavity and the vacuum micro-electronic device is supported adjacent to either side of the wall of the reactor cavity. In one such embodiment, the field cable is a quadax-copper cable.

In still another embodiment, a power cable powers both the nuclear detector and the vacuum micro-electronic device. In one preferred embodiment the vacuum micro-electronic device comprises a first stage that primes the electrical output of the nuclear detector to a drive amplifier, with a signal output of the drive amplifier coupled to a converter which is operable to convert the signal output of the drive input to a form compatible with transmission through an optical cable to which the drive amplifier signal is connected. Preferably, an output of the vacuum micro-electronic device is a means square voltage output compatible with monitoring the nuclear flux at the upper end of the intermediate range nuclear detector range. Preferably, the desired amplification output of the vacuum micro-electronic device is obtained from a predetermined power supply input to the vacuum micro-electronic device.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

As previously explained, ex-core detectors for the intermediate and power range are required to withstand a loss of coolant accident condition in which the connectors and cables are exposed to elevated temperatures of 200 degrees centigrade and gamma radiation up to 36 MRads. Current detector cable, field cable and connector designs have been shown to be very susceptible to these environmental conditions. One potential solution is to relocate at least two junction boxes outside of the flood zone. This relocation presents several issues such as increased cable losses, the need for additional junction boxes, additional equipment qualification programs and significant added costs. A solution is needed that can withstand the harsh environment while maintaining or exceeding the functionality of the current system.

This invention provides such a solution. The preferred embodiment comprises a vacuum micro-electronic device low noise amplifier which would replace the intermediate range pre-amplifier in a conventional ex-core instrumentation system. Given that the current intermediate range pre-amplifier is constructed from discrete components, (i.e., gates, amplifiers, etc.) and not microcontrollers or field programmable gate arrays, the vacuum micro-electronic device is a suitable replacement for these components and is less susceptible to being damaged by radiation and high temperatures and can be positioned much closer to the reactor vessel, either within the reactor vessel cavity or adjacent to the cavity. The vacuum micro-electronic device low noise amplifier improves the signal to noise ratio and noise figure significantly by the physical location of the amplifier closer to the reactor, which is much closer to the output of the ex-core detector (input to the entire nuclear instrumentation system signal transmission chain). Traditional signal theory shows that losses in the front end of a transmission chain influences the signal to noise ratio and noise figure more significantly than losses in later stages. Noise figure is a measure of how the signal to noise ratio is degraded by a device/system. The total noise factor attributed to the noise contribution of each stage in a cascade follow the Friis equation:

$$nf = nf_1 + \frac{nf_2 - 1}{g_1} + \frac{nf_3 - 1}{g_1 g_2} + \ldots + \frac{nf_N - 1}{g_1 g_2 g_3 \cdots g_{N-1}}$$

where $nf_N$ and $g_N$ is the linear noise figure and linear gain, respectively, of stage N. Noise figure is noise factor expressed in decibels (dB). The noise factor equation shows that stage one has the most influence in the overall noise factor/figure of a system. As a result, to reduce the total noise figure, the first stage device should have low noise and relatively high gain. That is why a low noise amplifier is the first active device in a communication system or a system, which processes very low level signals and requires high precision, such as the ex-core nuclear instrumentation system.

Figure 1:
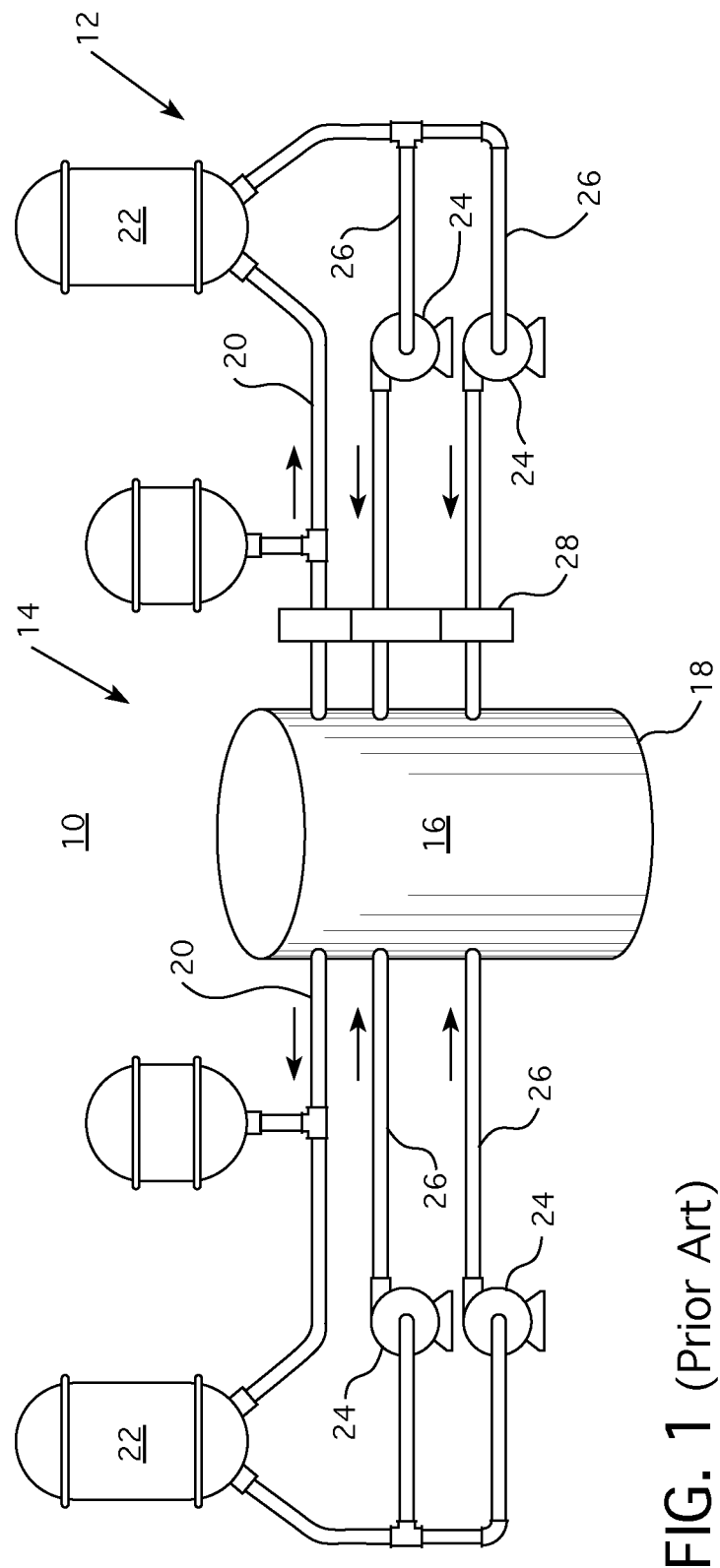
FIG. 1 is a schematic representation of the primary side of a nuclear power generating system.
Figure 2:
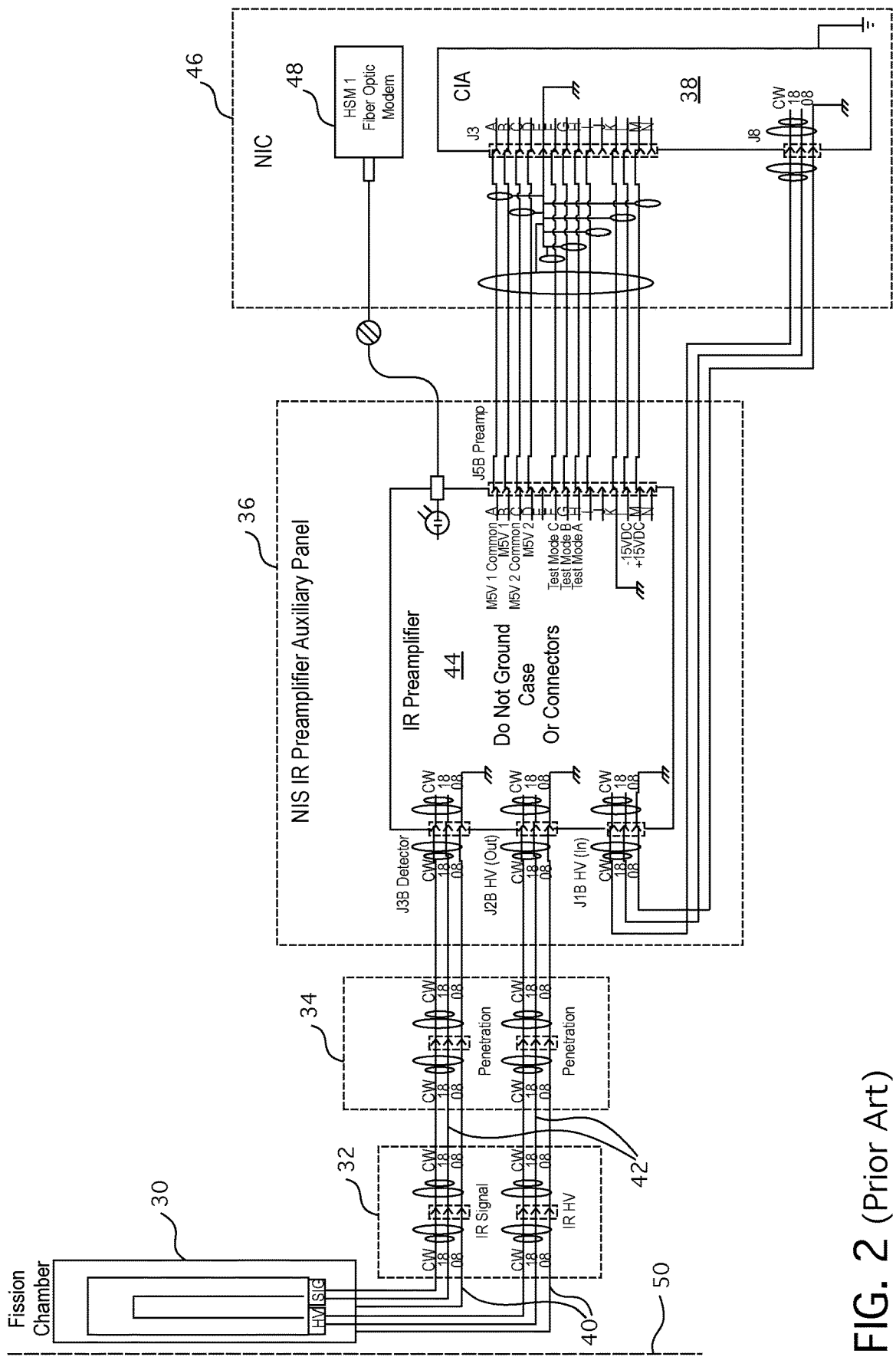
FIG. 2 is a high level circuit schematic diagram of one embodiment of a conventional ex-core intermediate range nuclear instrumentation system.
Figure 3:
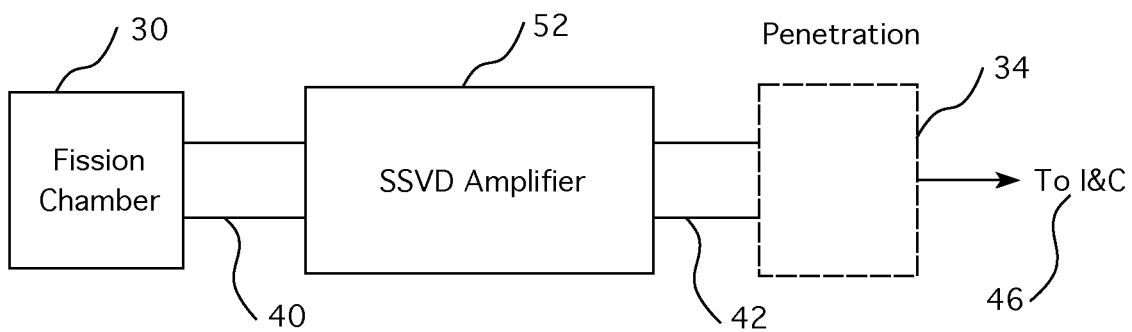
FIG. 3 is a block diagram of the detector system of this invention.

The vacuum micro-electronic device low noise amplifier is to be located between the ex-core detector output and the penetration, as close to the reactor vessel as practical, preferably in the reactor vessel cavity or in an area adjacent the cavity. This location enables a length reduction of the comparatively more expensive detector cable and more importantly, a reduction of the signal losses associated with approximately 200 feet of cabling. This solution does increase the length of field cable (quadax-copper cable) but reduces the complexity and costs of the junction box, the mating connectors and the field cable. The same power cable is preferably used to provide high voltage to the ex-core detector and to power the pulse amplifier in the vacuum micro-electronic device low noise amplifier. The overall reliability of the system would be improved since the vacuum micro-electronic device is not susceptible to the high temperature or radiation dose effects to which the current system has demonstrated vulnerability. FIG. 3 is a block diagram that shows the vacuum micro-electronic device in the system as it would replace the current intermediate range pre-amplifier 44 shown in FIG. 2.

Figure 4:
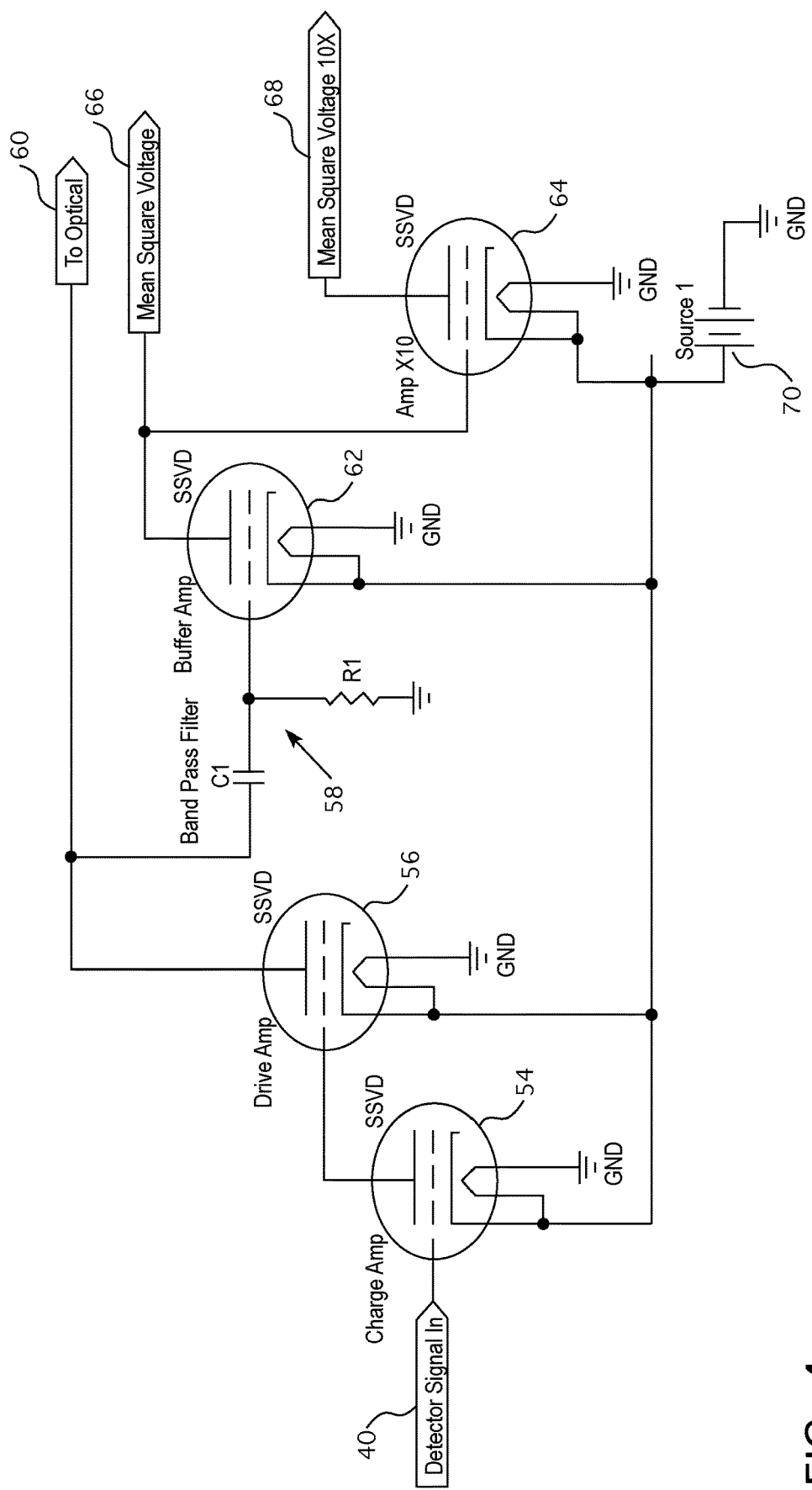
FIG. 4 is a high level circuit schematic of one embodiment of the vacuum micro-electronic device of this invention.

The design of this embodiment utilizes the vacuum micro-electronic devices to amplify the ex-core detector signal. The conventional design uses operational amplifiers that would not be reliable in a high radiation and high temperature environment. There are multiple stages of amplification that are required due to the low signal level of the sensors in the intermediate range detector. The new design will have multiple stages as needed for the various outputs. The first stage, the charge amplifier 54, will output a signal to the second stage, drive amplifier 56. The signal output of the drive amplifier 56 will be sent to amplifier 62 through the band pass filter 58 and to an optical cable 60. Two other means square voltage outputs 66 and 68 are also provided at the outputs of—buffer amplifiers 62 and 64, respectively. The means square voltage output is a method of measuring the neutron flux at the upper end of the intermediate range detector range. FIG. 4 is a circuitry schematic showing the ex-core detector signal processing by the vacuum micro-electronic devices. Each of the amplifiers 54, 56, 62 and 64 are vacuum micro-electronic devices, such as the SSVD supplied by Innosys Inc., Emeryville, Calif. A description of a vacuum micro-electronic device can be found in U.S. Pat. No. 7,005,783. Amplification stages could be eliminated by adjusting the power supply 70 inputs to each of the vacuum micro-electronic devices in order to achieve the gain needed for the specific amplification stage.

Accordingly, this invention dramatically improves the accuracy, noise figure and signal to noise ratio of the ex-core nuclear instrumentation system while reducing the complexity associated with the existing instrumentation cabling. Vacuum micro-electronic device technology is radiation hardened and has temperature tolerant characteristics which would allow the ex-core amplifier to be located inside the containment within the vicinity of the reactor vessel and the intermediate range detectors.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear reactor system including a nuclear reactor vessel housing a nuclear core in which fission reactions take place and a nuclear instrumentation system for monitoring the fission reactions, with the nuclear reactor vessel and at least a portion of the nuclear instrumentation system situated within a radiation shielded containment, the nuclear instrumentation system comprising:

a nuclear detector responsive to the number of fission reactions within the nuclear core to provide an electrical output indicative thereof;

a detector cable connected at one end to the electrical output of the nuclear detector, with the detector cable extending between the electrical output of the nuclear detector and a termination location within the containment;

a vacuum micro-electronic device low noise amplifier situated at the termination location within the containment and having a vacuum micro-electronic device input connected to the detector cable for receiving the electrical output of the nuclear detector and operable to amplify the electrical output of the nuclear detector to provide a nuclear detector amplified output signal;

a field cable connected at an input location of the field cable to an output of the vacuum micro-electronic device low noise amplifier, with the field cable extending from the input location through a penetration in the containment to a field cable output at a processing location outside the containment; and a Nuclear Instrumentation System Signal Processing Assembly located outside the containment at the processing location and connected at the field cable output and operable to receive the nuclear detector amplified output signal and from the nuclear detector amplified output signal measure neutron radiation emitted within the core to determine a power level of the nuclear reactor system, wherein the field cable is physically connected to the vacuum micro-electronic device low noise amplifier at the input location.

2. The nuclear reactor system of claim 1 wherein at least a portion of the detector cable is an integrated mineral insulated cable.

3. The nuclear reactor system of claim 1 wherein the nuclear detector is an intermediate range nuclear detector.

4. The nuclear reactor system of claim 1 wherein the vacuum micro-electronic device replaces a junction box between the intermediate range preamplifier and the nuclear detector in a conventional ex-core nuclear instrumentation system.

5. The nuclear reactor system of claim 1 wherein the nuclear detector is an ex-core detector.

6. The nuclear reactor system of claim 1 wherein the vacuum micro-electronic device is located within the containment in relatively close proximity to the nuclear detector.

7. The nuclear reactor system of claim 5 wherein the nuclear reactor vessel is supported within a reactor cavity and the vacuum micro-electronic device is supported adjacent to either side of a wall of the reactor cavity.

8. The nuclear reactor system of claim 1 wherein the field cable is quadax/copper cable.

9. The nuclear reactor system of claim 1 wherein a power cable powers both the nuclear detector and the vacuum micro-electronic device.

10. The nuclear reactor system of claim 1 wherein at least a portion of the field cable is a quadax/copper cable.

11. The nuclear reactor system of claim 1 wherein the vacuum micro-electronic device comprises a first stage that primes the electrical output of the nuclear detector to a drive amplifier, with a signal output of the drive amplifier coupled to a converter which is operable to convert the signal output of the drive input to a form compatible with transmission through an optical cable to which the drive amplifier signal is connected.

12. The nuclear reactor system of claim 1 wherein an output of the vacuum micro-electronic device is a mean square voltage output compatible with monitoring the nuclear flux at the upper end of an infrared nuclear detector range.

13. The nuclear reactor system of claim 1 wherein a desired amplification output of the vacuum micro-electronic device is obtained by a predetermined power supply input to the vacuum micro-electronic device.

* * * * *